United States Patent [19]

Thiele et al.

[11] Patent Number: 5,402,877
[45] Date of Patent: Apr. 4, 1995

[54] MEDIUM-CHAIN CONVEYOR WITH TWO-PART SCRAPERS, IN PARTICULAR DOUBLE MEDIUM-CHAIN CONVEYOR

[75] Inventors: Alfred Thiele, Iserlohn; Günther Philipp, Herne, both of Germany

[73] Assignee: Thiele GmbH & Co. KG, Iserlohn, Germany

[21] Appl. No.: 126,061

[22] Filed: Sep. 23, 1993

[30] Foreign Application Priority Data

May 19, 1993 [DE] Germany ............... 43 16 753.5

[51] Int. Cl.⁶ ............................................. B65G 19/24
[52] U.S. Cl. ..................................... 198/731; 198/834
[58] Field of Search ............... 198/731, 733, 834, 734; 474/155, 164

[56] References Cited

U.S. PATENT DOCUMENTS

| | | | |
|---|---|---|---|
| 4,027,770 | 6/1977 | Collier | 198/733 |
| 4,037,713 | 7/1977 | Soliman et al. | 198/834 |
| 4,433,777 | 2/1984 | Densmore | 198/834 |
| 4,473,364 | 9/1984 | Roling | 474/155 |
| 4,501,577 | 2/1985 | Roling et al. | 198/834 |
| 4,790,425 | 12/1988 | Braun et al. | 198/731 |
| 5,213,199 | 5/1993 | Braun et al. | 198/733 |

FOREIGN PATENT DOCUMENTS

| | | | |
|---|---|---|---|
| 159407 | 4/1904 | Germany . | |
| 168670 | 10/1904 | Germany . | |
| 941597 | 4/1956 | Germany . | |
| 1273915 | 7/1968 | Germany | 474/155 |
| 1525047 | 4/1970 | Germany | 474/155 |
| 8205475 | 2/1982 | Germany . | |
| 3115916 | 11/1982 | Germany . | |
| 3219178 | 11/1983 | Germany . | |
| 8411306 | 4/1984 | Germany . | |
| 3433715 | 4/1985 | Germany . | |
| 3234137 | 11/1986 | Germany . | |
| 3615734 | 11/1987 | Germany . | |
| 3704176 | 5/1990 | Germany . | |
| 1611213 | 11/1990 | U.S.S.R. . | |
| 1694448 | 11/1991 | U.S.S.R. . | |

Primary Examiner—Joseph E. Valenza
Attorney, Agent, or Firm—Michael J. Striker

[57] ABSTRACT

In a medium-chain conveyor with two-part scrapers, in particular in the form of a double medium-chain conveyor, with a specific link thickness standardized, for example according to DIN, the horizontal links have a shorter pitch than the standard pitch. The side links of the chain wheel have a length corresponding to the length of the shortened horizontal links, which is shorter than the standard pitch; and that, in the area underneath the chain wheel side links, the teeth of the chain wheel are asymmetrical in the direction of rotation of the chain wheel or in the direction of travel of the chain, as a result of removing material on the toothed flank in the direction of travel and adding material to the opposing toothed flank. A substantially higher service life of the chain wheels and of those parts of the entire chain belt system in such conveyors interacting therewith is achieved by this.

6 Claims, 3 Drawing Sheets

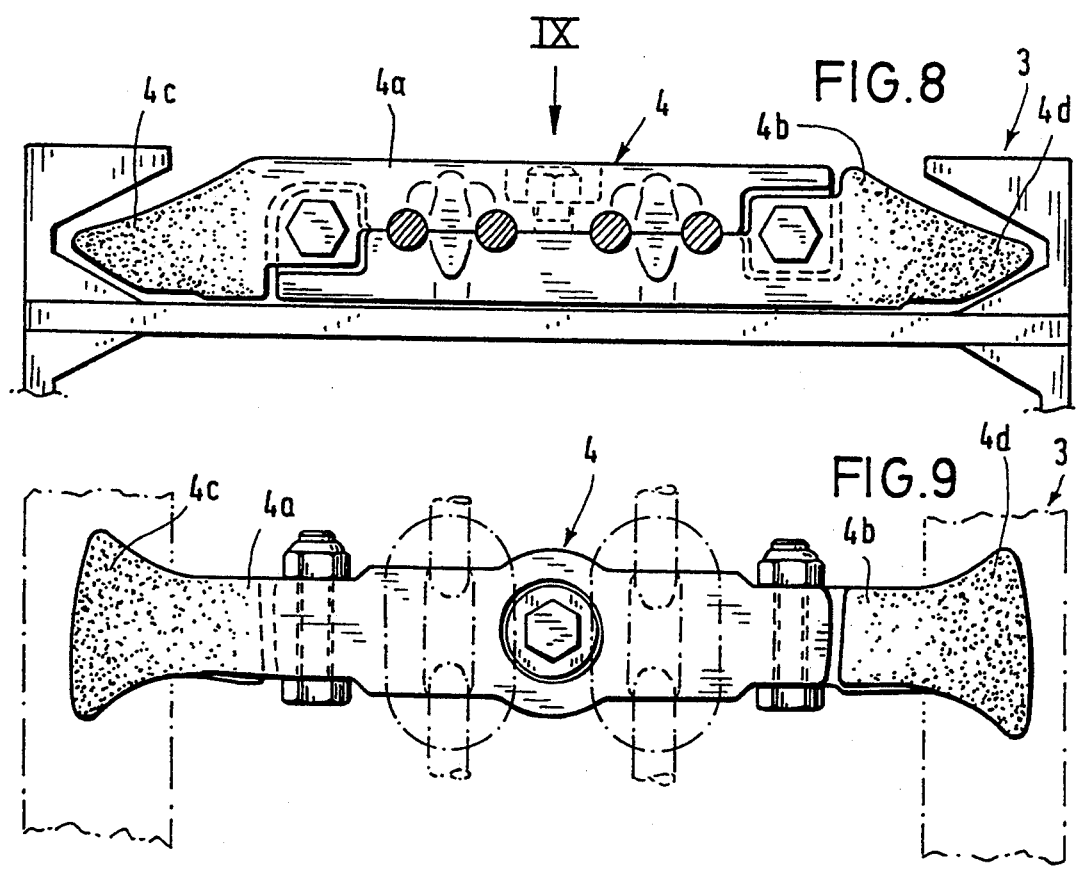
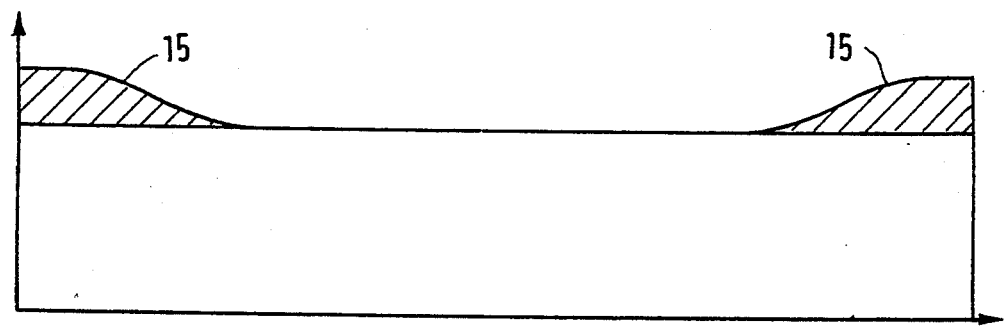
FIG.10

MEDIUM-CHAIN CONVEYOR WITH TWO-PART SCRAPERS, IN PARTICULAR DOUBLE MEDIUM-CHAIN CONVEYOR

FIELD OF THE INVENTION

The invention relates to a medium-chain conveyor with two-part scrapers, in particular in the form of a double medium-chain conveyor, in which a chain belt system composed of welded horizontal round steel links alternating with forged vertical flat links having the same cross-section, is guided over chain wheels with side links for the horizontal links on chain wheel teeth accommodating the vertical flat links in a central slot between their two teeth halves.

BACKGROUND OF THE INVENTION

Medium-chain conveyors, and double medium-chain conveyors in particular, have proved to be a versatile and efficient transport means over decades in black coal mining, where they have been generally used in underground longwall working.

Underground longwall working was introduced from Europe into North America about 20 years ago. Today, more than half the underground black coal production is achieved using longwall working ("longwalling"). North American longwalling has in the meantime far outrun European longwalling with respect to output, face output, face lengths and lengths of working panels (also as a result of the less complex geological features). The coal winning, transport and excavation systems have been adapted to the increased demands of the North American market, whereas the individual components of the transport systems, such as conveyor chains, scrapers and chain wheels of chain scraper conveyors, for example, have not.

Modern American shearer loaders achieve production levels of more than 2000 t/h with cutting depths of 1 m (40 in) and more, and at speeds of travel of about 15 m/min (260 ft/min) as well as with usual seam thicknesses of about 2 m (78 in). These mass flows must be transported using chain scraper conveyors. Although the size of the available conveyors with troughs of standardised width and height, and the speeds of the chain belt systems are adequate to cope with these mass flows, problems arise with the chain belt system and the corresponding chain drive wheels in respect of the following:

the chain thicknesses necessary with the given drive power as a result of the high mass flow, presently up to 1350 kW (1800 hp), under the confined geometric conditions of the conveyor;

the extreme wear on the scraper tips as a result of the almost uninterrupted movement of the scrapers under load through the trough sections of the scraper conveyors, and the extreme wear on the side links of the chain wheels as a result of non-positive and positive power transmission at a very high level and as a result of wear on the chain pitch occurring after only a short time in operation. The pitch of the chain wheel side links no longer matches the pitch of the chain link to be driven, and therefore the chain connectors and scrapers on the chain strand protrude from the horizontal links of the chain belt, which they are fastened to, between the teeth against the chain wheel axis and, as wear of the chain wheel side links on the tooth flanks lying in the direction of rotation increases, come into contact with the root of the teeth. This causes wear on the root or base of the chain wheel teeth which leads to these weakening and often prematurely snapping off unchecked.

An additional factor that complicates matters in particular here is that the wear on the chain wheel side links is not linearly dependent on their time in operation or on the quantity of coal transported, but increases exponentially as a result of the side links hardening on use after the hard protective layer has pierced the soft base material. This also increases the risk of wear on the root of the chain wheel teeth, which means that chain wheels frequently have to be changed during production shifts, and not during maintenance and weekend shifts, as scheduled. This leads to costly and unscheduled production outages.

One possibility of at least partly eliminating these difficulties is to increase the chain thicknesses, taking into account the given geometric restrictions of the available conveyors.

The available conveyors present two different geometric restrictions with respect to chain thicknesses:

1. The height of the conveyor trough section restricts the outer width of the vertically mounted chain link, in particular in relation to the lower run (the return channel of the chain belt).
2. The pitch circle diameter of the chain wheel is a function of the pitch and the link diameter of the chain used, whereby the chain pitch has a substantially greater influence. The pitch circle diameter is, however, decisive in respect of the size of the drive frame. In the confined conditions underground, the pitch circle diameter has an even greater influence on the angle of the chain belt on its entry and exit from the drive frame. The greater the pitch circle diameter with a given drive frame length, the greater the angle of the chain belt becomes, and this leads to a further increase in wear on the profiles of the drive frame and the scrapers as well as to additional frictional resistances.

The following applies as regards chain wheel wear:

Chain wheel wear can only be conditionally counteracted, as the complicated chain wheel geometry and the casting materials used do not allow the application of heat treatment processes similar to those used in the production of chains and scrapers. The hardness penetration depths usual at present for chain wheel side links of 6 to 8 mm can not therefore be increased any further, since the base material of the chain wheel teeth must have a minimum elasticity to protect them against snapping. An additional difficulty in the case of chain belt systems with reduced pitch is that the width of the teeth in peripheral direction of the chain wheel is further reduced by the short pitch of the chain.

However, the chain wheel must not be left out of the consideration regarding centre-strand conveyor systems under high load. The ratio of the number of contacts between an individual chain link and a chain wheel side link to the number of contacts between an individual chain wheel side link and the chain links to be driven, which is about 1:350 with usual face lengths, is in itself sufficient basis for optimisation considerations.

A further important consideration with a view to improving the corresponding chain wheel is to permit the time the chain wheel is replaced to be changed and planned. As already mentioned above, the assumed wear for chain wheels is about 6 to 8 mm on the basis of the hardness penetration depth of the chain wheel side links or teeth. Monitoring of this low assumed value is only possible at considerable expense in underground mining operations. For exact wear measurements, the chain would have to be removed from the chain wheel in a time-consuming exercise for the side links to be checked. Things are different in practice: wear measurements are not carried out. Consequently, the time for replacement is not recognised in good time. The necessity to replace the chain wheel is more likely to be realised when about 10 to 15 mm of wear is clearly visible on its outside. By this time, however, the scrapers and the chain connectors are already touching the base of the chain wheel teeth. This not only causes mechanical damage to the chain wheel teeth resulting in some of the teeth snapping off, but also leads to considerable mechanical damage to the chain connectors and scrapers, which subsequently result in unchecked shutdowns and faults.

SUMMARY OF THE INVENTION

The object of the invention is to develop, medium-chain conveyors with two-part scrapers, in particular double medium-chain conveyors Of the aforementioned type, with optimum efficiency, while retaining the standardised conveyor trough; and also to improve their wear characteristics under difficult operating conditions in such a way that the chain belt systems used sustain higher production levels over longer periods of time, and the chain wheels used at the drive and return stations have more favourable wear characteristics and, in keeping with the longer service life of the chain belt systems, may therefore each be replaced at the right time after a specific period in service and monitored wear characteristics, without any additional interruptions to operation.

This object is achieved according to the invention, which provides a medium-chain conveyor with two-part scrapers, in particular double medium-chain conveyor, in which a chain belt system composed of welded horizontal round steel links alternating with forged vertical flat links having the same cross-section, is guided over chain wheels with side links for the horizontal links on chain wheel teeth accommodating the vertical flat links in a central slot between their two teeth halves, wherein with a specific link thickness standardised, for example, according to DIN, said horizontal links have a shorter pitch than the standard pitch; said side links of said chain wheel have a length corresponding to the length of the shortened horizontal links, which is shorter than the standard pitch; and, in the area underneath said chain wheel side links, said teeth of said chain wheel are asymmetrical in the direction of rotation of said chain wheel or in the direction of travel of said chain, as a result of removing material on the tooth flank in the direction of travel and adding material to the opposing tooth flank.

These measures, both with respect to monitoring of the wear characteristics of the chain wheel teeth and regarding the wear characteristics of the scrapers as an essential structural part of such medium-chain conveyors, are substantially supplemented in a particularly advantageous manner as follows.

The teeth of the chain wheel are preferably provided with one or several marks on or next to their tooth flank meshing with the curved section of the horizontal chain link in the direction of rotation to indicate wear.

The marks on the tooth may be raised and/or recessed.

Said scrapers may be composed of drop-forged scraper halves, and the tips on both scraper halves may each be fully hardened.

The geometric restrictions outlined as a result of the standardised profile of the conveyor troughs are taken into account in the medium-chain conveyor according to the invention in that 1. the vertically mounted chain link of the chain belt system is flattened on its outer width by forging, while retaining its original cross-sectional area, and
2. the pitch of both the welded horizontal links and of the forged vertical flat links is reduced to the next-lower nominal size, for example, in accordance with DIN 22252.

Consequently, the pitch of the vertically mounted flat links and that of the horizontally mounted round steel links are the same. However, the pitch of the horizontal links, which is shorter than that of the standardised chain according to DIN 22252, requires special manufacture, since flash welding of the horizontal links and the subsequent deburring of the reinforcements generally assume minimum pitch.

Therefore, to optimise the wear characteristics of the chains, scrapers and chain wheel side links, wear must be minimised in three different areas.

1. Chain pitch wear is taken into account by the following measures:

The hardness of the curved area of the horizontal links and the vertical links is greater than that of the shank. Therefore, the curved area has a higher resistance to pitch wear and to wear at the external curved area of the horizontal links resulting from interaction between chain and chain wheel. The softer shanks acquire their working capacity and the required elasticity from the chain link. This technique known per se is also used in this new chain belt system because of its advantages of application.

2. Chain wheel wear is handled in the following way:

The wear characteristics of the chain wheel side links are substantially improved by an optimised contact surface between the chain and chain wheel side link. It is particularly advantageous here that the flat chain used as horizontal link has a standard chain link, merely having shortened pitch, and also has a considerably larger external width than the vertically mounted flat links. In this, the present chain belt system also differs from other systems, in which both chain links are flat. The horizontal link is the chain link driven by the chain wheel side link. The length of contact area between the nose or curve of the horizontal link and the correspondingly curved contact surface on the chain side link is thus increased in comparison to chains with flat horizontal links by about 10 mm. Since a chain, which is thicker by a nominal size, comes into operation with the same pitch as the next-lower chain thickness, the height of the contact area of the thicker horizontal link in the chain side link is also increased by 4 mm. A further increase in contact surface and a resulting reduction in the contact pressure may be achieved by providing as narrow a slot as possible between the chain wheel side links to accommodate the vertically mounted flat links. If reshaping of the round steel chain links by forging to form flat links results in correspondingly narrow tolerances, then the manufacturing tolerances for the width of the flattened shanks of the vertical links may also be kept extremely low. If production is correspondingly accurate, therefore, the dimensions of the slot for the vertical links on the chain side links may be reduced by about 4 mm. This results in an overall improvement of the contact surface for the horizontal links on the chain wheel side link of about 40%.

Considering that chain wheels are almost exclusively operated in one direction of rotation, symmetrical assembly of the chain wheel teeth is completely unnecessary. An asymmetrical tooth configuration in the direction of travel is more likely to enable a considerably larger free space to be created between the root of the tooth and the scraper or chain connector. If material is removed from the tooth flank below the chain wheel side link in the direction of travel in front of the horizontal link and material is added to the opposite side, i.e. if the tooth shape is made asymmetrical by adding wear material to the contact surface with the horizontal link and a corresponding interstice on the opposite tooth flank, the free space between the root or base of the tooth and the chain connectors or scrapers, which are fastened to the horizontal links of the chain belt system, may be increased to about 25 to 30 mm, without weakening the tooth. Wear may be made apparent by one or several lateral marks next to the chain wheel side link on each tooth. If wear greater than the assumed magnitude is discovered in the new chain belt, then there still remains sufficient time, even in the case of an exponential rate of wear, to arrange the necessary change for the next maintenance or weekend shift.

3. Therefore, the following must be taken into consideration with respect to wear on the scraper tips:

The practically uninterrupted movement of the scrapers through the trough section of the conveyor under load of coal and quartz mining material causes rapid wear of the scraper tips both along the length and height of the scrapers. The consequence of this is that the overlap of the trough section over the rim or end of the scraper tips is no longer adequate and the chain belt is disengaged from the trough section guide. For this reason, it was necessary, inter alia, to completely replace the scrapers of a chain belt long before the chain had reached the end of its expected service life.

An attempt has already been made to approach this problem by flame hardening the scraper tips to make them more resistant to wear. This solution to the problem is, however, only of short duration, since—in a similar manner to the chain wheel—wear on the scraper tips increases exponentially after the hardened surface has abraded.

The invention goes a decisive step further: the scraper tips are hardened continuously to a high level and are therefore wear-resistant to a higher degree over the entire period of service. The central part of the two-part scrapers retains the original hardness to ensure the required elasticity for the dynamic stresses.

In a first particularly advantageous embodiment, the process for the manufacture of such two-part scrapers for centre-strand conveyors of the aforementioned type is characterised in that both scraper halves are firstly hardened to a high level, and that, in the different cross-sections of the scraper halves outside the scraper tips, partial inductive tempering then follows at different tempering temperatures in such a way that the previously achieved hardness is only retained at the tips of the scraper halves.

In another equally favourable embodiment, the process for the manufacture of such two-part scrapers is characterised in that both scraper halves are firstly hardened to a high level, that the scraper halves are then fully relaxed, and that the scraper halves are subsequently tempered in a salt bath at different temperatures and different depths of suspension of the scraper halves in such a way that the previously achieved hardness is only retained at the tips of the scraper halves.

BRIEF DESCRIPTION OF THE DRAWINGS

A preferred embodiment of the invention is shown schematically in the drawing.

FIG. 8 shows a view of a split scraper on a double centre-strand conveyor with chain wheel and chain belt system according to FIGS. 1 to 7;

FIG. 9 shows a top view onto the scraper in the direction of the arrow IX in FIG. 8; and FIG. 10 shows a diagram of the strength/hardness curve a such a split scraper over its length between the scraper tips.

DESCRIPTION OF THE PREFERRED EMBODIMENT

Figure 1:
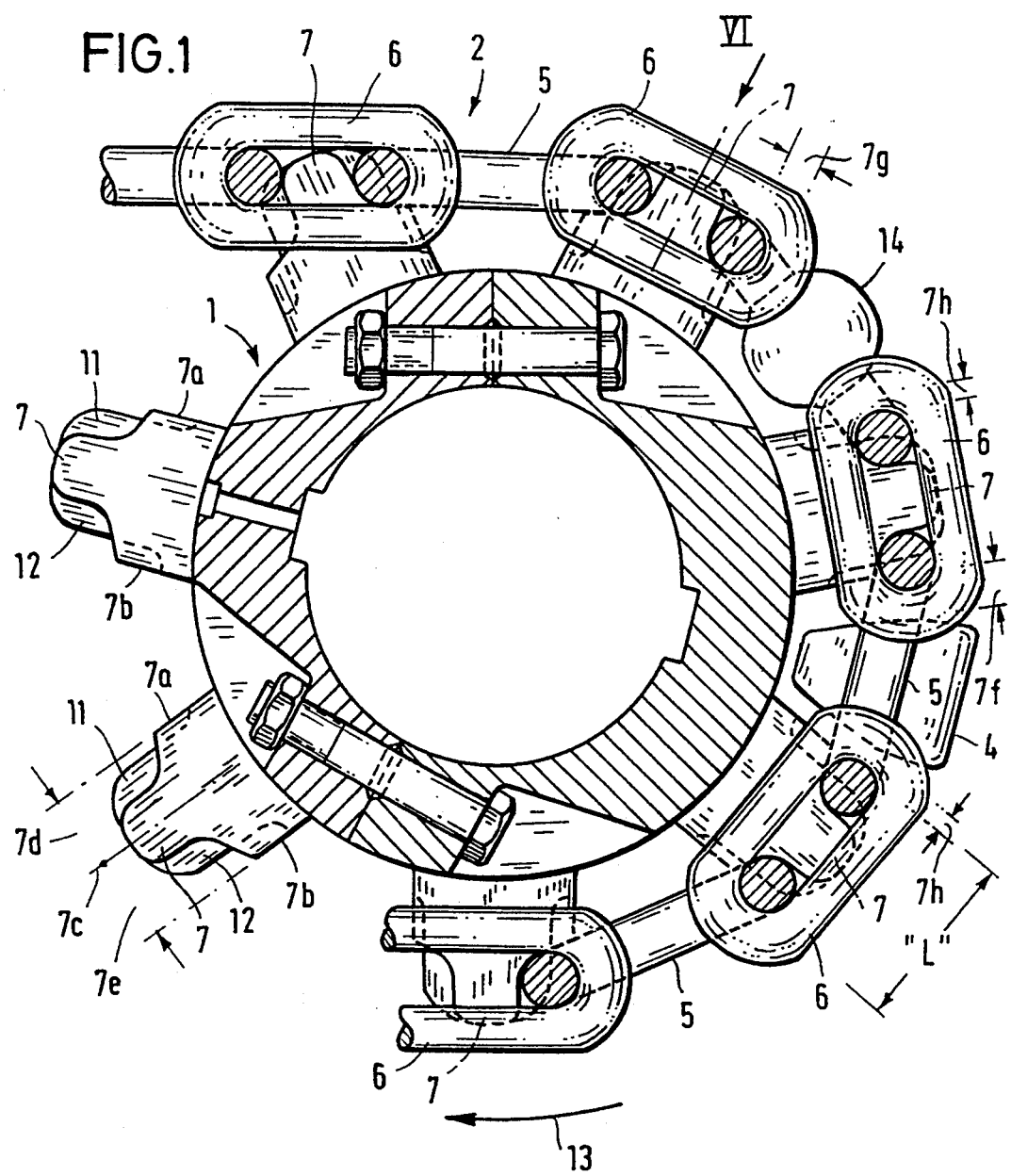
FIG. 1 shows a part section of a chain wheel of a centre-strand conveyor with the corresponding chain belt system.
Figure 2:
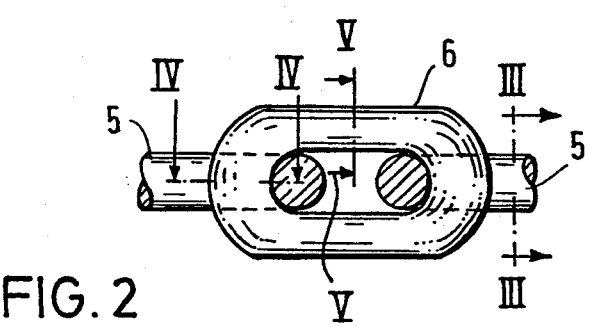
FIG. 2 shows a diagram of part of a flattened vertical link and two adjoining round steel links of the chain belt.
Figure 3:
FIG. 3 shows a cross-section through a shank of the round steel links along the cutting line III—III in FIG. 2.
Figure 4:
FIG. 4 shows a section through the curved area or nose of a horizontal link of the chain belt along the cutting line IV—IV in FIG. 2.
Figure 5:
FIG. 5 shows a cross-section through a shank of the flattened vertical link of the chain belt along the cutting line V—V in FIG. 2.
Figure 6:
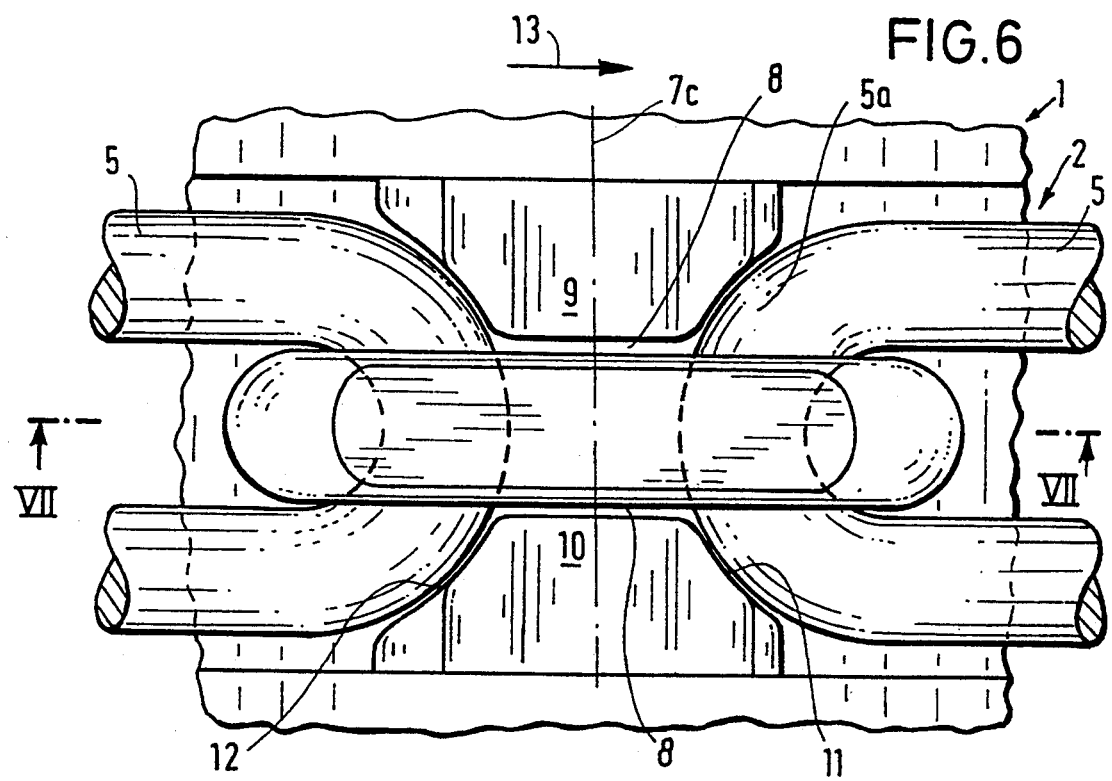
FIG. 6 shows an enlarged top view of a partly cutaway section of FIG. 1 onto a tooth of the chain wheel with the chain belt hung in place in the direction of arrow VI in FIG. 1.

The chain wheel 1 with chain belt system 2 shown in FIG. 1 is provided for medium-chain conveyors 3 with two-part scrapers 4 known per se, as shown in the part diagrams in FIGS. 8 and 9, and particularly for double medium-chain conveyors. In this case, the chain belt system 2 comprising round steel links 5, each with the same cross-section, whereby the welded horizontal round steel links 5 are alternated with links reshaped by forging to form vertical flat links 6, is guided over chain wheels 1 with teeth 7. The chain wheel teeth 7 accommodate the vertical flat links 6 in a central slot 8 between their two halves 9, 10 and have chain wheel side links 11, 12 to accommodate the horizontal round steel links 5 on the flanks 7a, 7b of the chain wheel teeth 7 lying opposite one another in peripheral direction.

Figure 7:
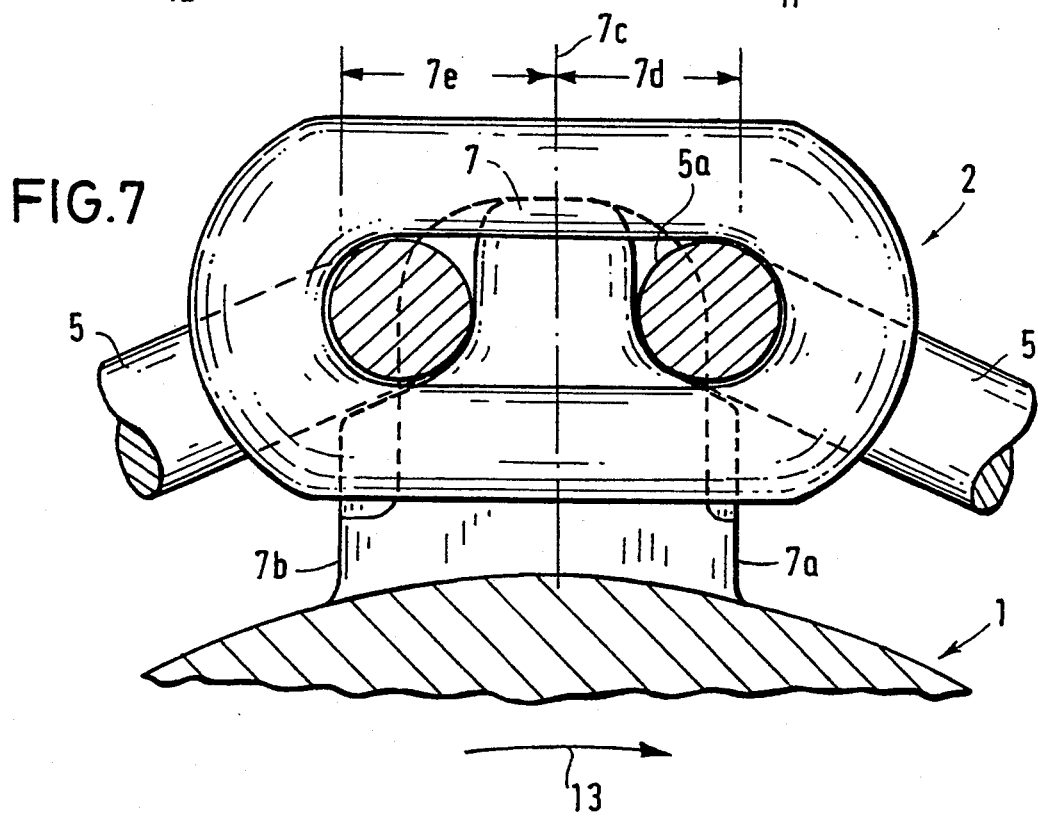
FIG. 7 shows a part section through the chain wheel in the area of the tooth with the chain belt along cutting line VII—VII in FIG. 6.

With a specific link thickness, e.g. one standardised according to DIN 22252, the horizontal round steel links 5 have a pitch which is shorter than the standard pitch. In consequence, the chain wheel side links 11, 12 of the chain wheel 1 also have a length corresponding to length "L" of the shortened horizontal links, which is less than the standard pitch. Similarly, the teeth 7 of the chain wheel 1 are asymmetrical in the direction of rotation of the chain wheel or in the direction of travel of the chain, as a result of removing material on the tooth flank 7a in the direction of travel 13 of the chain or in the direction of rotation of the chain wheel 1, and adding material to the opposing tooth flank 7a. The tooth flank 7a at the front, as viewed in the direction of rotation of the chain wheel 1, is in this case preferably 5 mm (2/10 inch) to 10 mm (4/10 inch) smaller in the area of the tooth base with respect to the radial central axis 7a of the tooth 7, than the opposing tooth flank 7a (distances 7d and 7e in FIGS. 1 and 7).

Because of the asymmetric tooth configuration of the chain wheel 1, the distances 7f and 7g of the scraper 4 and chain connector 14 respectively from the tooth 7 are increased. Distance 7h on the rear or flank 7b of the previous tooth 7 lying opposite, as viewed in the direction of rotation 13 of the chain wheel 1, however, is reduced.

During operation, wear occurs on the chain wheel side links 11 on the flanks 7a of the chain wheel teeth 7 meshing with the curved areas 5a of the horizontal links 5. As wear increases on the periphery of the chain wheel 1, the chain belt 2 shifts relatively against the direction of rotation 13. Because of the higher assumed value for distance 7f or 7g, wear on the side links 11 of the chain wheel 1 may be tolerated for longer before the scrapers 4 and chain connectors 14 touch the tooth root. Damage to scrapers 4, chain connectors 14 and chain wheel teeth 7 occurs later. The chain wheels 1 may be replaced later.

The particular advantage of this is that the wear on the chain wheel 1 can be clearly seen from the outside before damage occurs, and there is still sufficient time to schedule the necessary chain wheel replacement.

In older systems, the time for replacing the chain wheel, which although due was generally missed due to lack of early recognition, was frequently only recognised once teeth had snapped off or scrapers and chain connectors had been damaged.

In order to be able to quantify wear on teeth 7 of the chain wheel 1 at an early stage, one or several marks may be made to indicate wear on the teeth 7 of the chain wheel 1 on or next to their tooth flank 7a meshing with the curved section 5a of the horizontal chain link 5 in the direction of rotation 13. These marks on the tooth may be raised and/or recessed.

The scrapers 4 are composed of drop-forged scraper halves 4a, 4b, the tips 4c, 4d on both scraper halves each being fully hardened.

According to a first process, such slit scrapers 4 may be produced in such a way that both scraper halves 4a, 4b are firstly hardened to a higher level, and that, in the different cross-sections of the scraper halves outside the scraper tips 4c, 4d, partial inductive tempering then follows at different tempering temperatures in such a way that the previously achieved hardness is only retained at the scraper tips.

However, in another process the scrapers 4 may also be manufactured in such a way that both scraper halves 4a, 4b are firstly hardened to a high level, the scraper halves 4a, 4b are then fully relaxed, and that the scraper halves are subsequently tempered in a salt bath at different temperatures and different depths of suspension of the scraper halves in such a way that the previously achieved hardness is only retained at the scraper tips.

On the basis of these two processes, a strength/hardness curve 15 results for the two scraper halves 4a, 4b, as shown in the diagram in FIG. 10, wherein the fully hardened tips 4c, 4d of the two scraper halves have a substantially higher strength/hardness than the scraper sections lying between them.

We claim:

1. A medium-chain conveyor, comprising a conveyor part; a plurality of two-part scrapers; and a chain system for displacing said scrapers and including a chain wheel and chain belt guided over said chain wheel, said chain belt including a plurality of horizontal round links and a plurality of vertical flat links alternating with one another, said chain wheel having a plurality of chain wheel teeth including two halves which define therebetween a central slot for accommodating said vertical flat links and also including side links for accommodating said horizontal round links, said teeth of said chain wheel in an area underneath said side links being asymmetrical in a direction of rotation of said chain wheel so that a first toothed flank in a direction of rotation of said chain wheel has less material underneath said side links and a second toothed flank in a direction opposite to the direction of rotation of said chain wheel has more material underneath said side links so that as viewed in the direction of rotation said first toothed flank is smaller in an area of a tooth base with respect to a tooth radial central axis than said second tooth flank.

2. A medium-chain conveyor as defined in claim 1, wherein said links of said chain belt have a standardized thickness, said horizontal round links of said chain belt having a shorter pitch than a standard pitch, said side links of said chain wheel having a length corresponding to a length of said horizontal round links which is shorter than the standard pitch.

3. A medium-chain conveyor as defined in claim 1, wherein said horizontal round links are formed as welded steel links, said vertical flat links being formed as forged links having the same cross-section as said horizontal round links.

4. A medium-chain conveyor as defined in claim 1, wherein each of said scrapers is composed of drop-forged scraper halves having tips which are hardened.

5. A process for manufacturing a medium-chain conveyor, comprising the steps of providing a conveyor part; arranging a plurality of two-part scrapers in the conveyor part; connecting said scrapers with a displacing system including a chain wheel and a chain belt guided over said chain wheel, forming said chain belt so that it has a plurality of horizontal round links and a plurality of vertical flat links alternating with one another; forming said chain wheel so that it has a plurality of chain wheel teeth including two halves which define therebetween a central slot for accommodating said vertical flat links and also including side links for accommodating said horizontal round links; removing material on a toothed flank in a direction of rotation of the chain wheel on the teeth of the chain wheel and adding material on a toothed flank which is opposite to the direction of rotation of the chain wheel, so as to make the teeth of the chain wheel asymmetrical in the direction of rotation of the chain wheel, arranging the scrapers including first hardening both scraper halves to a higher level; and then in different cross-sections of the scraper halves outside scraper tips, partially inductively tempering the scraper halves at different tempering temperatures, so as to retain previously achieved hardness only at the tips of the scraper halves.

6. A process for manufacturing a medium-chain conveyor, comprising the steps of providing a conveyor part; arranging a plurality of two-part scrapers in the conveyor part; connecting said scrapers with a displacing system including a chain wheel and a chain belt guided over said chain wheel, forming said chain belt so that it has a plurality of horizontal round links and a plurality of vertical flat links alternating with one another; forming said chain wheel so that it has a plurality of chain wheel teeth including two halves which define therebetween a central slot for accommodating said vertical flat links and also including side links for accommodating said horizontal round links; and removing material on a toothed flank in a direction of rotation of the chain wheel on the teeth of the chain wheel and adding material on a toothed flank which is opposite to the direction of rotation of the chain wheel, so as to make the teeth of the chain wheel asymmetrical in the direction of rotation of the chain wheel, arranging the scrapers including firstly hardening both scraper halves to a high level; fully relaxing the scraper halves; tempering the scraper halves in a salt bath at different temperatures and different depths of suspension of the scraper halves in such a way that a previously achieved hardness is only retained at the tips of the scraper halves.

* * * * *